United States Patent
Pupillo et al.

(10) Patent No.: US 7,972,204 B2
(45) Date of Patent: Jul. 5, 2011

(54) VEHICLE DOOR SEAL VENTING SYSTEM AND METHOD

(75) Inventors: Dominic S. Pupillo, Clarkston, MI (US); James J. Karlavage, Novi, MI (US); Paul R. Meernik, Redford, MI (US); Yih-Chyun Sheu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 900 days.

(21) Appl. No.: 11/763,696

(22) Filed: Jun. 15, 2007

(65) Prior Publication Data

US 2008/0309119 A1  Dec. 18, 2008

(51) Int. Cl.
*B60H 1/24* (2006.01)
*B60H 1/26* (2006.01)
*B60J 10/08* (2006.01)
*B60J 5/00* (2006.01)

(52) U.S. Cl. ............... 454/164; 454/143; 296/146.9; 296/146.7

(58) Field of Classification Search ............ 454/69, 454/162, 164, 165; 296/146.9
See application file for complete search history.

(56) References Cited

U.S. PATENT DOCUMENTS

| | | | | | |
|---|---|---|---|---|---|
| 4,445,721 | A | * | 5/1984 | Yaotani et al. | 296/154 |
| 5,462,482 | A | * | 10/1995 | Grimes | 454/143 |
| 5,476,626 | A | * | 12/1995 | Miyama et al. | 264/129 |
| 5,626,383 | A | * | 5/1997 | Lee et al. | 296/146.9 |
| 5,820,191 | A | * | 10/1998 | Blakewood et al. | 296/37.13 |
| 6,203,096 | B1 | * | 3/2001 | Noda et al. | 296/146.6 |
| 6,412,852 | B1 | * | 7/2002 | Koa et al. | 296/146.7 |
| 6,955,392 | B2 | * | 10/2005 | Dry | 296/146.7 |
| 7,100,966 | B2 | * | 9/2006 | Kohara et al. | 296/154 |
| 2006/0012215 | A1 | * | 1/2006 | Kohara et al. | 296/146.1 |
| 2008/0169672 | A1 | * | 7/2008 | Moccio et al. | 296/154 |

FOREIGN PATENT DOCUMENTS

| | | | |
|---|---|---|---|
| DE | 3921381 A1 | * | 1/1991 |
| JP | 2002-154337 A | | 5/2002 |
| JP | 2002154332 A | * | 5/2002 |
| JP | 2002154338 A | * | 5/2002 |
| JP | 2006123582 A | * | 5/2006 |

\* cited by examiner

*Primary Examiner* — Steven B McAllister
*Assistant Examiner* — Frances Kamps
(74) *Attorney, Agent, or Firm* — Quinn Law Group, PLLC

(57) ABSTRACT

A vehicle door seal venting system is provided for venting air trapped in the seal gap between two or more spaced environmental seals. As the vehicle door transitions to a closed position, the seals engage between the vehicle door and vehicle body door opening, acting to closeout the seal gap. The compression of the seal gap as the door further closes results in pressurization of the trapped air, which then acts to resist closure of the vehicle door, therefore requiring that additional closure force be applied to fully close the door. The vehicle door seal venting system relieves the pressurized air from between the seals without compromising the integrity of the seals or overall noise and sealing performance of the door system.

7 Claims, 3 Drawing Sheets

VEHICLE DOOR SEAL VENTING SYSTEM AND METHOD

TECHNICAL FIELD

The present invention provides a vehicle door seal venting system for venting air trapped by door closure between two or more tandem environmental seals closing the seal gap between a vehicle door and the door opening in the vehicle body.

BACKGROUND OF THE INVENTION

In motor vehicles, even when the vehicle door is fully closed, it is typical for an open space or void, also referred to as a seal gap, to be present between the vehicle door and the vehicle door body opening. This seal gap is necessary to provide sufficient clearance around the vehicle door to permit the door to be freely opened and closed without interfering with or contacting the vehicle body structure about the vehicle door opening. In a motor vehicle it is highly desirable to closeout this perimeter door gap or seal gap to prevent elements present on the exterior of the vehicle, such as rain, water, dust and debris from entering the interior of the vehicle through the seal gap. Additionally, road noise and wind noise present on the exterior of the vehicle is attenuated before reaching the vehicle interior by providing an environmental seal to closeout the seal gap. To achieve this environmental closure, one or more resilient weather strips are typically employed to surround the seal gap between the periphery of the vehicle door and vehicle body to close out the seal gap. Each peripheral weather strip or resilient seal may also be referred to herein as a seal member. The resiliency of the seal member enables the seal member to maintain environmental closure of the seal gap by dynamically adjusting for dimensional changes in the seal gap as the vehicle body and door flex and move during normal vehicle operation.

It is typical to provide at least one environmental seal in the seal gap around a vehicle door. In certain vehicles, two more seal members may be present in tandem to closeout a seal gap. The additional seal is particularly useful in providing an additional sealing layer between the vehicle door and vehicle door opening to reduce the sound pressure level of noise entering the interior of the vehicle from the vehicle exterior, such as road noise and wind noise.

The presence of a resilient seal in the seal gap such as a weather strip is known to increase the force required to close the vehicle door, due at least partially to the force required to compress the resilient seal in the seal gap as the vehicle door closes.

SUMMARY OF THE INVENTION

The present invention provides a vehicle door seal venting system for venting air trapped between two or more environmental seals as the vehicle door closes. Such tandem environmental seals are typically positioned and configured to closeout between the vehicle door and the vehicle body door opening with the seals spaced apart in some fashion. The spacing between the environmental seals in the seal gap between the door and vehicle body door opening results in a trapped air zone or airlock between the seals, typically near the rear portion of the door. As the vehicle door transitions to a closed position, the seals engage between the body structure surrounding the vehicle body door opening and the vehicle door before the door fully closes to close out the seal gap thereby trapping air in the airlock between the environmental seals. As the vehicle door transitions further toward the closed position, the seal gap is dimensionally compressed as peripheral portions of the vehicle door move closer to the body structure surrounding the vehicle body door opening. This compression of the seal gap as the door closes results in decreasing the volume of the seal gap causing pressurization of air trapped in the airlock region between the tandem spaced environmental seals. The pressurized trapped air exerts a reactive force on the door which acts to resist closure of the vehicle door, therefore requiring that additional force be applied to fully close the vehicle door.

The present invention advantageously provides a vehicle door seal venting system to vent the pressurized air in the airlock between the tandem environmental seals. In the present invention the vehicle door is equipped with a first or outer seal member positioned and configured to provide a first environmental seal around periphery portions of the vehicle door. The outer seal member is configured to closeout the seal gap between the vehicle door and the vehicle door opening when the door is in the closed position. A second or inner seal member is also provided and spaced apart from the outer member; the inner seal member is similarly positioned and configured to provide a second environmental seal of the seal gap. The first and second environmental seals cooperate in tandem, doubling up the environmental door seal between the interior of the vehicle and the vehicle exterior. Each seal is configured and adapted to block the entrance of water, dirt and debris into the vehicle interior as well as to attenuate the sound pressure level of road and wind noise entering the interior of the vehicle. The door seal venting system of the present invention includes a vent passage provided in portions of the vehicle door system. The vent passage is in air flow communication with the airlock in the seal gap when the vehicle door is in the closed position and is configured to permit air to be vented from the airlock into the vehicle's interior as the vehicle door closes, thereby reducing the force required to close the vehicle door.

According to one aspect of the invention, the vent passage is configured to vent the airlock while maintaining seal integrity of the environmental seals. This is important as the airlock may be vented in other less desirable ways. For example, the air lock may be vented by providing a gap, void or break in one of the environmental seals. This gap, void or break compromises or defeats the environmental seal, potentially permitting air, dirt, water and road noise to bypass the seal and enter the vehicle interior. In contrast, the door seal venting system of the present invention vents pressurized air from the airlock without compromising the environmental seals in the seal gap between the vehicle door and vehicle body door opening by creating a torturous path in the door trim system.

According to another aspect of the invention, the second environmental seal is configured to sealably engage a peripheral inside portion of the vehicle door and the vent passage is positioned and configured to vent the trapped air from the airlock to an interior portion of the vehicle door rather than through either the first or second seals, thereby maintaining the integrity of the first and second seals.

According to another aspect of the invention, a trim panel is secured to an interior portion of the vehicle door. The trim panel includes a seal lip on a periphery portion of the trim panel, the seal lip is configured and adapted to sealably mate against a portion of the inner seal member to at least partially form the second environmental seal. The vent passage communicates between the airlock in the seal gap and a region behind the trim panel and within the vehicle door to vent the airlock into the vehicle door while maintaining seal integrity of the first and second environmental seals.

According to another aspect of the invention, at least one spacer rib is secured to a rear surface of the trim panel. The at least one spacer rib is configured to maintain at least a defined spacing or gap along the seal lip of the trim panel between the interior portion of the vehicle door and the trim panel. This defined spacing provides an entrance portion of the vent passage in communication with the airlock between the environmental seals. The at least one spacer rib supports the lip of the trim panel at a defined spacing from the interior portion of the vehicle door to resist the sealing force applied to the lip by the inner seal member when the door is closed onto the inner seal member, thereby maintaining the vent passage open between the lip and the interior of the door to the airlock.

Another aspect of the invention is a method of relieving trapped air between outer and inner seals interposed between a vehicle door exposed to exterior air and a vehicle body defining a vehicle interior without compromising the integrity of the outer and inner seals for excluding at least one of noise, dust and water leaks from entering the vehicle interior. The method includes venting the trapped air around the door's inner seal, but not the outer seal, back into the vehicle's interior via controlled leakage along the bottom of the vehicle door.

A further aspect of the method includes venting of the trapped air between the seals which is controlled by sufficiently offsetting one panel of the door from another panel of the door to define a vent passage having a cross sectional area of substantially 250 to 500 square centimeters for leaking the trapped air.

A still further aspect of the method includes venting which is controlled by sufficiently offsetting one panel of the door from another panel of the door by sufficient vertical ribs along a bottom of one of the panels to maintain a predetermined seal margin under compression when the vehicle door is closed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
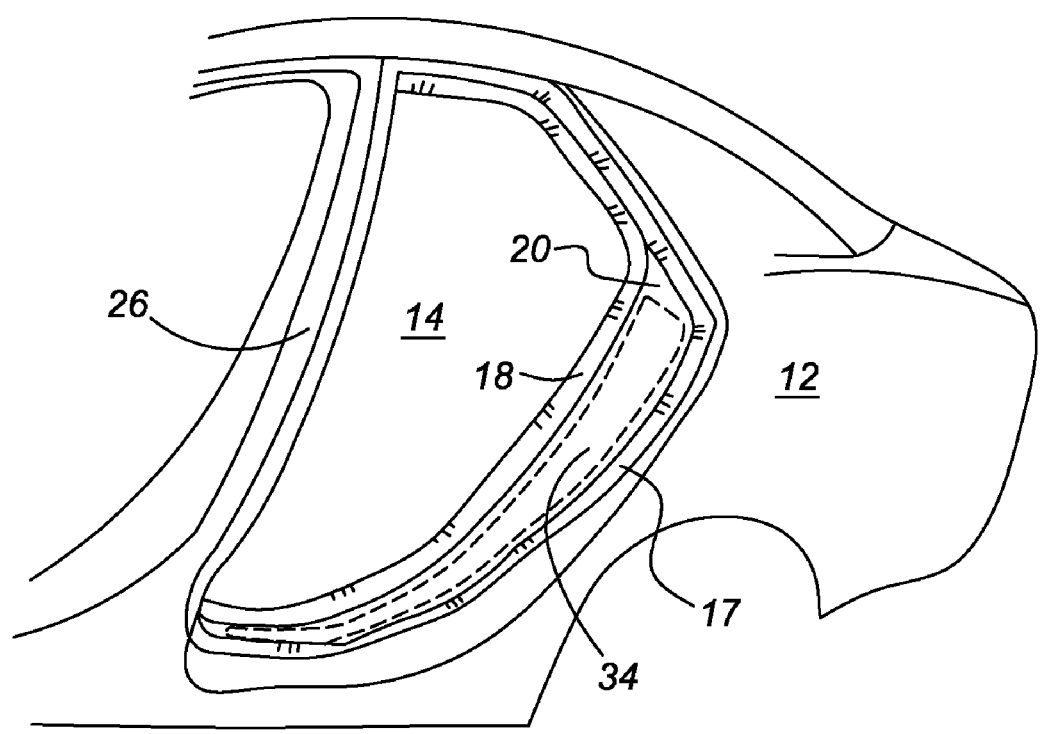
FIG. 1 illustrates a partial side perspective view of a vehicle body showing an exemplary body door opening equipped with a body mounted one of two environmental seals intended to cooperate in tandem, consistent with the present invention.

FIG. 1 illustrates a partial side perspective view of a vehicle body 12 showing an exemplary body door opening 14 having a periphery sidewall 20. A door mounted outer, primary or first seal member 16 (see FIG. 2 or 3) contacts a portion 17 of the vehicle door opening sidewall 20 disposed about the periphery of the door opening 14. The first seal member 16 is secured to a periphery portion of the vehicle door 24 (see FIG. 2), but may alternatively be secured to the sidewall portion 17 as identified in FIG. 1. An inner or second seal member 18 is provided and is adapted to be spaced apart from the first seal member 16 and also is mounted to the sidewall 20 of the vehicle door opening 14. The second seal member 18 may be secured to a portion of the vehicle door 24 (see FIG. 2), or may alternatively be secured to a portion of the vehicle body 12 such as the periphery sidewall 20 of the door opening 14 as illustrated in FIG. 1.

The seal members 16, 18 are typically resilient seals formed of rubber or other similar resilient or elastomeric material which remain plyable and resilient over a wide temperature range and resist degradation from sunlight, water and water borne chemicals in normal vehicle use. Such resilient seals are well known in the automotive art. In the case of a vehicle rear door, the vehicle door 24 (see FIG. 3) is typically hingeably secured to the vehicle pillar 26 (see FIG. 1) so that the vehicle door 24 is pivotal in an outwards direction away from the vehicle body 12 to an open position (not shown). Vehicle door hinges and the hingable opening and closing operation of vehicle doors are well known in the art and are not dwelt upon herein. The first seal member 16 and second seal member 18 are positioned to seal between the vehicle door opening 14 in the vehicle body 12 and the periphery side portion 22 of the vehicle door 24 (shown in FIG. 2) when the vehicle door 24 hingeably transitions to a closed position against the vehicle body 12 (see FIG. 2). The first seal member 16 and the second seal member 18 each provide closure between the sidewall 20 of the door opening 14 and the vehicle door 24 (see FIG. 2) by compressably contacting and bridging between the sidewall 20 and the vehicle door 24. With the vehicle door 24 in the closed position against the seal members 16, 18, the first seal member provides a first environmental seal and the second seal member provides a second environmental seal of the seal gap 28 (see FIG. 2). The environmental seals formed by seal members 16, 18 work in tandem or cooperate to seal the seal gap 28 against the ingress of air, water, dirt and dust into the vehicle interior 30 (see FIG. 2) from the vehicle exterior 32 (see FIG. 2). Additionally, the tandem combination of the environmental seals formed by seal members 16, 18 are particularly beneficial for reducing the noise level of road noise and wind noise reaching the vehicle interior 30 from the exterior 32 of the vehicle.

The spacing between the first seal member 16 and the second seal member 18 in the seal gap 28 (see FIG. 2) results in a trapped air zone or airlock 34 between the seal members 16, 18 when the vehicle door is closed. The trapped air zone or airlock 34 is depicted in FIG. 1 as the dashed line area also labeled as 34. As the vehicle door transitions from the open position to the closed position, the seal members 16, 18 engage between the vehicle door 24 and the sidewall 20 of the door opening 14 to close out the seal gap 28, trapping air in the airlock 34 between the seal members 16, 18. As the vehicle door 24 transitions further toward the closed position, the seal gap 28 is dimensionally compressed as peripheral side portions 22 (see FIG. 2) of the vehicle door 24 (see FIG. 2) move closer to the body structure surrounding the vehicle body door opening, specifically the sidewall 20. This compression of air volume in the seal gap as the vehicle door 24 closes results in pressurization of air trapped in the airlock 34 between the tandem environmental seals formed by seal members 16, 18. The pressurized trapped air acts to resist further closure of the vehicle door, therefore requiring that additional closure force be applied to fully close the vehicle door 24, additional force that would not be required if the pressurized air was not trapped in the airlock 34.

Figure 2:
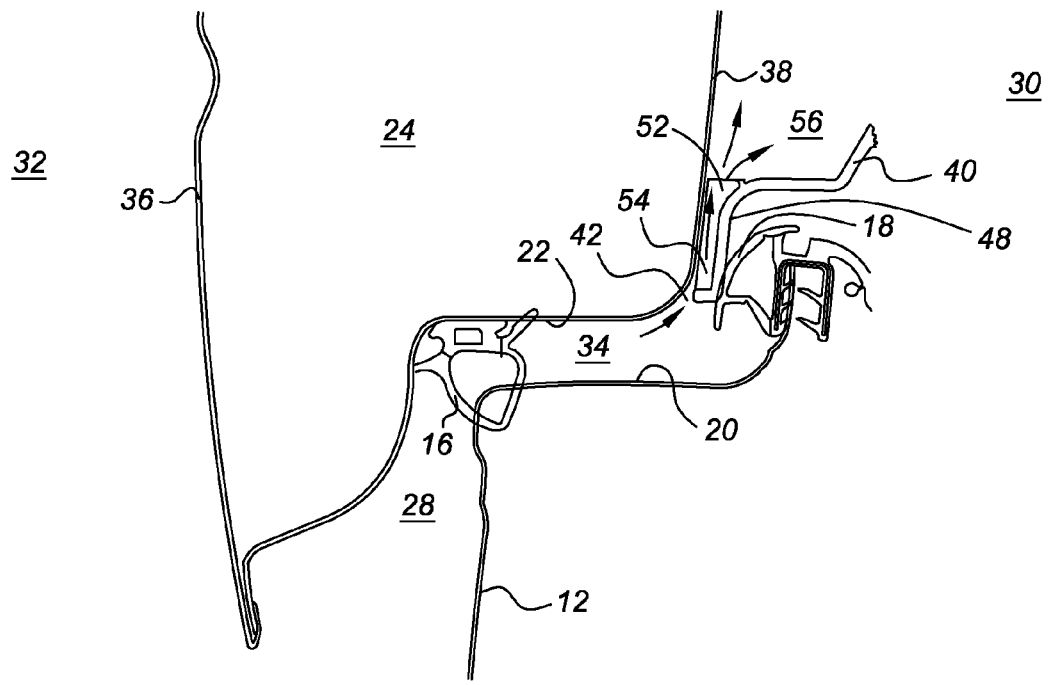
FIG. 2 illustrates a side sectional view of a portion of a vehicle door in a closed position relative to a portion of the vehicle body of FIG. 1, illustrating a first and a second seal member providing a first and a second environment seal between the vehicle door and the vehicle body, consistent with the present invention.

FIG. 2 illustrates a side sectional view of a portion of an exemplary vehicle door 24 in a closed position relative to a vehicle body 12, illustrating the seal gap 28 or void between the closed vehicle door 24 and the periphery sidewall 20 of the vehicle door opening 14 (see FIG. 1). The seal gap 28 exists to provide clearance to permit vehicle door 24 to open and close without interfering with the vehicle body 12, as well as to provide clearance for vehicle body component manufacturing and assembly tolerances. If seals 16, 18 are omitted, the presence of the seal gap 28 allows potential passage of dust, dirt, water and road noise to enter the vehicle interior 30 from the vehicle exterior 32. The vehicle door 24 has a door outer panel 36, door inner panel 38 and a trim panel 40 positioned proximate to and secured to an interior facing surface of the door inner panel 38.

The first seal member 16 (the outer seal member) and the spaced apart second seal member 18 (the inner seal member) provide the first and second environment seals between the vehicle door 24 and the vehicle body 12, closing the seal gap 28. The first seal member 16 seals between the peripheral sidewall 20 of the vehicle body door opening 14 (see FIG. 1) and periphery side portion 22 of the vehicle door 24. The second seal member 18 seals between the peripheral sidewall 20 of the vehicle body door opening 14 (see FIG. 1) and the seal lip 48 of the trim panel 40. The tandem environmental seals provided by first seal member 16 and second seal member 18 form a portion of an airlock 34 that traps and pressurizes air between the seal members 16, 18 as the door closes. The trapped air acts to resist closure of the vehicle door 24. The present invention provides a vehicle door seal venting system to vent the air trapped in the airlock during door closure as will be discussed below. The lip portion 48 of the trim panel 40 is spaced apart or offset from the inner door panel 38, providing a vent passage 54 through which pressurized air trapped in the airlock 34 between the seal members 16, 18 may vent (illustrated by the arrows in FIG. 2 indicating air flow) into a region 56 between the door inner panel 38 and the trim panel 40. The first seal member 16 and second seal member 18 are resilient so as to be easily compressible or deformable according to variations in the spacing in the seal gap 28. The seal members 16, 18 are illustratably depicted in FIG. 2 in a non-deformed state. The first seal member 16 therefore appears in FIG. 2 to encroach into the periphery sidewall 20 of the door opening. Similarly, the second seal member 18 illustratably appears to encroach into the lip member 48 of the trim panel 40. With the door 24 in the closed position as illustrated in FIG. 2, the seal member 18 would actually deform to sealably contact between the sidewall 20 and lip member 48 and would not physically encroach into the seal lip 48 nor into the sidewall 20. At the same time, seal member 16 would actually deform to sealably contact between sidewall 20 and inner door panel 22. When the vehicle door 24 is transitioning to the closed position, at some point during the transition the first seal member 16 and the second seal member 18 closeout the seal gap 28 and thereby define the trapped air space or airlock 34. The trapped air would tend to pressurize as the door continues to transition to the closed position. However, in the present invention the air trapped in the airlock 34 is free to vent into an area in the door between the trim panel 40 and the door inner panel 38 as illustrated by the arrows depicting airflow in FIG. 2. Trapped air flows into the gap or entrance portion 42 of the vent passage 54 through the substantially 2 mm gap between the seal lip 48 of the trim panel 40 and the door inner panel 38. Spacer ribs 52 (see FIGS. 3 and 4) sufficiently space door inner panel 38 and trim panel 40 to form the gap that relieves the trapped air along the bottom of the vehicle door 24 and directs airflow into the region 56 between the trim panel 40 and the door inner panel 38 where it may vent to the interior of the vehicle door 24 and vehicle interior 30 without compromising the seals 16, 18.

Figure 3:
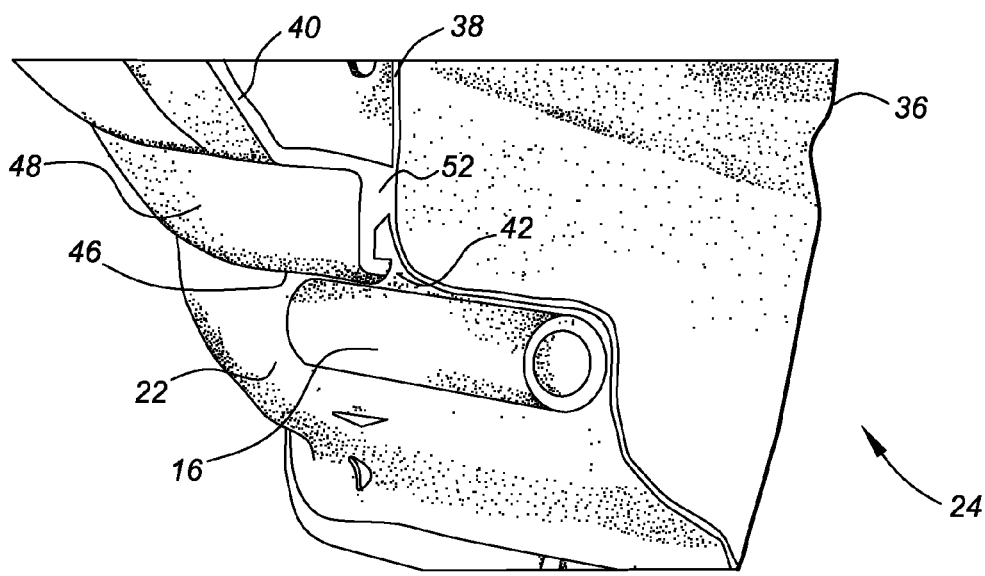
FIG. 3 illustrates a sectional side view of the lower portion of an exemplary vehicle door partially in elevation and broken away to show a door mounted outer seal, a door outer panel, inner panel, door trim panel and a portion of the airlock vent passage, consistent with the present invention.

FIG. 3 illustrates another sectional side view of the lower portion of an exemplary vehicle door 24 depicting a door outer panel 36, a door inner panel 38, a door trim panel 40 and a gap or entrance portion 42 of the airlock vent passage 54 (see FIG. 2). In the depicted embodiment the entrance portion 42 extends along a length of the bottom edge 46 of the trim panel 40 providing a sufficient cross sectional area to the entrance portion 42 of the vent passage 54 to permit a sufficient flow of air to vent from the airlock 34 (see F*ig.* 2) as the vehicle door 24 closes. The trim panel 40 includes at least one spacer rib 52. The spacer ribs 52 are configured to maintain at least a defined spacing or gap between the inner door panel 38 and the trim panel 40. The spacer ribs 52 of the trim panel 40 rest against or abut the door inner panel 38 and provide support to the seal lip 48 to resist the sealing force applied by the resilient second seal member 18 (see FIG. 2) to the seal lip 48, thereby ensuring the vent passage 54 (see FIG. 2) between the trim panel 40 and the door inner panel 38 remains consistent and open to vent air from the airlock 34.

Figure 4:
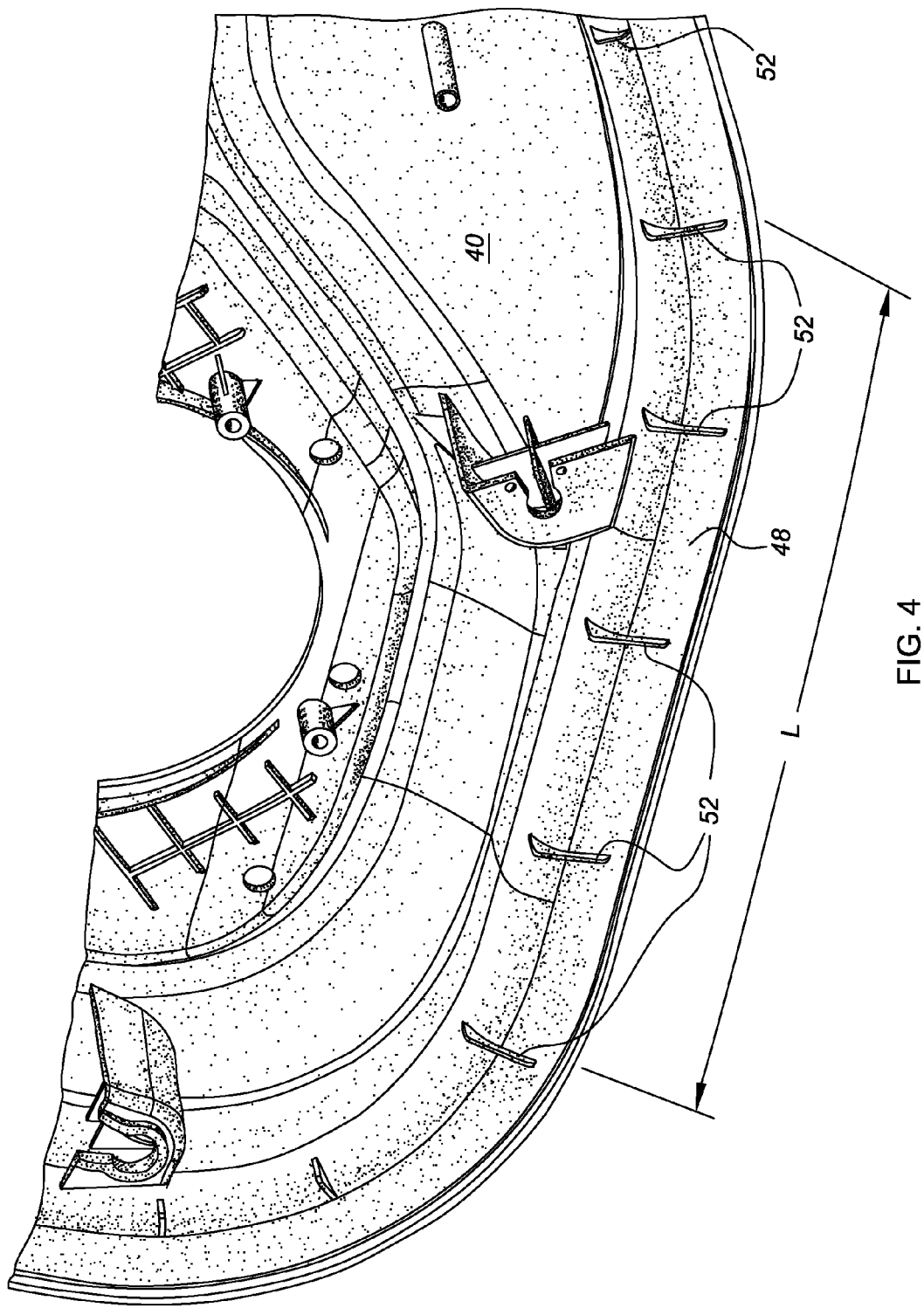
FIG. 4 illustrates a rear perspective view of a bottom portion of the exemplary door trim panel shown in FIG. 3 and depicting spacer ribs on its backside, consistent with the present invention.

FIG. 4 illustrates a rear or backside view of a bottom portion of an exemplary trim panel 40 of the vehicle door 24, depicting the side of the trim panel that would face the door inner panel 38 (see FIG. 3) when installed. A plurality of spacer ribs 52 are secured to the seal lip 48 to support the seal lip 48 in an offset fashion from the door inner panel 38 (see FIG. 3) as discussed earlier. In the depicted embodiment, the spacer ribs 52 are aligned to direct airflow from the airlock 34 (see FIG. 2) to the region 56 between the trim panel 40 and the door inner panel 38. The spacer ribs are not limited to the vertically aligned ribs illustrated in FIG. 4, but may instead be any configuration of spacer ribs having gaps or spaces provided to permit fluid air communication between the airlock 34 and the region 56. As illustrated in FIG. 4, the spacer ribs 52 support the seal lip 48 over a sufficient length L to provide a sufficient cross sectional area between the seal lip 48 and door inner panel 38 (see FIG. 3) to sufficiently vent air from the airlock 34. In certain embodiments it has been found that providing a vent passage with a cross sectional area in the range of 250 to 500 square millimeters is sufficient to keep the airlock depressurized as the door closes and thereby reduce the energy required to close the vehicle door by between 0.5 to 2.0 Joules. The gap width itself is limited to 2-4 mm to achieve the desired air venting effect but at the same time not be visible to the customer. This reduction in closing energy is significant given the typical door closing energy requirement of 4+/−2 Joules per door.

Also disclosed is a method of relieving trapped air between the outer and inner seals of a vehicle door sealing system interposed between a vehicle door exposed to exterior air and a vehicle body defining a vehicle interior without compromising the integrity of the vehicle door sealing system or excluding at least one of noise, dust and water leaks into the vehicle interior. The method includes venting of air trapped between the outer and inner seals around the inner seal and into the vehicle's interior via controlled leakage of the trapped air around the inner seal but not the outer seal. In a preferred embodiment, the venting is controlled by sufficiently offsetting one panel of the vehicle door from another panel of the vehicle door to define a vent of substantially 250 to 500 square millimeters for leaking such trapped air.

While the best modes for carrying out the invention have been described in detail, those familiar with the art to which this invention relates will recognize various alternative designs and embodiments for practicing the invention within the scope of the appended claims.

The invention claimed is:

1. A vehicle door seal venting system for a motor vehicle door positioned in a vehicle door opening formed by a vehicle body, the door having an outer door panel and an inner door panel, the vehicle door seal venting system comprising:
   an outer seal member positioned and configured to provide a first environmental seal, and an inner seal member spaced apart from said outer seal member, said inner seal member positioned and configured to provide a second environmental seal;
   such that a seal airlock is formed in a space defined between said first environmental seal and said second environmental seal, said airlock trapping air between said first and second environmental seals when said vehicle door closes, said trapped air acting to resist closure of said door; and
   a trim panel secured to an interior facing surface of said inner door panel, said trim panel including a seal lip spaced apart from said inner door panel, the space between said inner door panel and said trim panel providing a vent passage through which pressurized air trapped in said airlock may vent to a region behind said trim panel, and configured and adapted to sealably mate against a portion of said inner seal member to at least partially form said second environmental seal;
   wherein the vent passage is configured to permit air to escape from said airlock as said vehicle door closes, said vent passage operative to vent said trapped air during door closure thereby reducing a required force to close said vehicle door.

2. The vehicle door seal venting system of claim 1, wherein said vent passage is configured to vent said airlock while maintaining seal integrity of said first and said second environmental seals.

3. The vehicle door seal venting system of claim 2, wherein said second environmental seal is configured to sealably engage a peripheral inside portion of said vehicle door; wherein said vent passage vents trapped air from said airlock to an interior portion of said vehicle door.

4. The vehicle door seal venting system of claim 1, further comprising:
   at least one spacer rib extending from a surface of said trim panel, said at least one spacer rib configured to maintain at least a defined spacing between an interior portion of said vehicle door and said trim panel along a peripheral portion of said trim panel, said defined spacing providing an entrance portion of said vent passage, said at least one spacer rib supporting said seal lip of said trim panel to resist a sealing force of said inner seal member on said trim panel to maintain said entrance portion of said vent passage open.

5. The vehicle door seal venting system of claim 4, wherein said at least one spacer rib is a plurality of spacer fibs, said spacer ribs positioned in a substantially spaced parallel relationship, said spacer ribs aligned in a direction of intended air flow in said vent passage.

6. The vehicle door seal venting system of claim 5, wherein said plurality of spacer ribs extend from a portion of said trim panel toward said interior facing surface of said inner door panel at regularly spaced positions, said plurality of spacer ribs maintaining said vent passage with sufficient cross sectional area to substantially prevent pressurization of said airlock as said vehicle door closes.

7. The vehicle door seal venting system of claim 6, wherein said entrance portion of said vent passage is provided at a bottom edge of said trim panel.

\* \* \* \* \*